United States Patent [19]
Santoleri

[11] 3,861,330
[45] Jan. 21, 1975

[54] INCINERATOR FOR AQUEOUS WASTE MATERIAL

[75] Inventor: Joseph J. Santoleri, Berwyn, Pa.

[73] Assignee: The Trane Co., La Crosse, Wis.

[22] Filed: Mar. 13, 1974

[21] Appl. No.: 450,862

[52] U.S. Cl.................. 110/7 S, 110/8 C, 110/28 F
[51] Int. Cl. .............................................. F23g 5/12
[58] Field of Search............ 110/7 R, 7 S, 8 R, 8 C, 110/28 F, 18 R, 18 C

[56] References Cited
UNITED STATES PATENTS

| | | | |
|---|---|---|---|
| 3,396,681 | 8/1968 | Hubbard................................ | 110/8 |
| 3,500,775 | 3/1970 | Hubbard................................ | 110/8 |
| 3,577,940 | 5/1971 | Hasselbring et al. .................. | 110/8 |
| 3,805,714 | 4/1974 | Sharpe................................... | 110/8 |

*Primary Examiner*—Kenneth W. Sprague
*Attorney, Agent, or Firm*—John W. Logan, Jr.

[57] ABSTRACT

A compact and light-weight incinerator for burning aqueous waste material and particularly sewage sludge includes a horizontal generally cylindrical incinerator chamber having inner and outer concentric metal shells with means between the shells to direct flow of cooling air and to contain insulation at selected locations to maintain a relative uniform temperature along the inner shell and to keep the outer shell cool. Sewage sludge or other aqueous waste is directed axially into the incinerator chamber from one end wall of the chamber while a high velocity burner directs hot products of substantially complete combustion tangentially into the chamber adjacent the introduction of the sewage sludge. Air is injected into the combustion chamber in the form of jets directed angularly inward toward the sludge to spray the sludge outwardly toward the rapidly moving products of combustion and quickly atomize the aqueous solution of sewage sludge.

10 Claims, 7 Drawing Figures

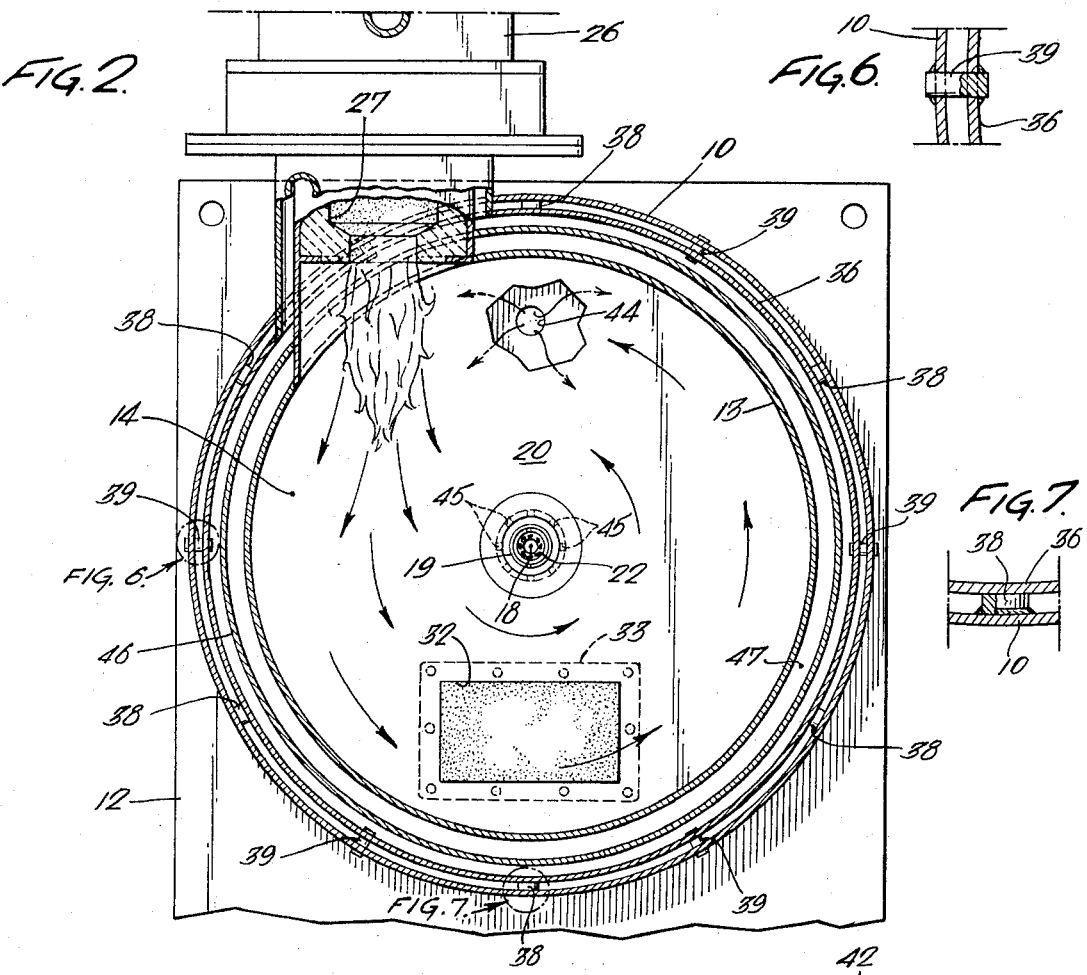

3,861,330

INCINERATOR FOR AQUEOUS WASTE MATERIAL

The present invention relates to new and useful improvements in incinerators primarily designed for disposing of aqueous waste material such as sewage sludge by evaporating the moisture from the sludge and completely oxidizing or burning the sludge.

More particularly, the present invention relates to sewage sludge disposal units designed for use aboard ships to dispose of sludge generated in the lavatories and wash basins of the ship. This requires the provision of a compact light-weight unit adapted to sporadic intermittent operation.

Sludge of this type is composed primarily of water at a level which may range from 94 percent to close to 100 percent with the remaining fraction of the sludge composed of organic material in the form of solids. In the incineration of any aqueous waste containing organic material, it is necessary to adequately mix the water and solids prior to injection of the waste into the incinerator and then inject the material in such a manner that there is a rapid vaporization of the liquid and a rapid elevation of the temperature of the organic material to its incineration temperature. At the same time, the inner surface of the shell of the incineration chamber should be a uniform hot temperature within relatively close limits while the outer surface of the incinerator must remain cool enough so that it will not burn a person who might touch it. This must be accomplished without the use of a refractory material to maintain the weight of the incinerator at an acceptable level for use on a ship. Similarly, to maintain a compact unit the incineration chamber must be kept as small as possible yet have sufficient retention time for the organic material to allow complete incineration.

With the foregoing in mind, a primary object of the present invention is to provide a novel compact light-weight incinerator which will effectively and completely incinerate aqueous waste material containing organic solids, such as raw sewage sludge, eliminate odors from the sludge and will not discharge any organic material through the stack to the atmosphere.

Another object of the present invention is to provide a novel light-weight incinerator for the incineration of aqueous waste material in which the side walls of the incineration chamber are of metal and the temperature of the walls controlled to maintain the inner surface of the walls at a uniform hot temperature to insure complete incineration of the material yet maintain the outer surface of the incinerator cool enough so that personnel in the area of the incinerator will not be burned.

Still another object of the present invention is to provide a novel incinerator for aqueous material containing organic solids including means to atomize the material to be burned as it is injected into the incineration chamber and simultaneously with atomization provide adequate combustion air for complete combustion of the solid material so that the water content of the aqueous solution is quickly vaporized and the organic material is rapidly raised to its incineration temperature.

A further object of the present invention is to provide a novel incinerator of the type set forth above in which the material injected into thu incineration chamber is maintained out of contact with the walls of the chamber to protect the walls of the incineration chamber from corroding.

A further object of the present invention is to provide a novel incinerator of the type described including the provision of means to control the stack temperature to prevent the stack from becoming above heated.

A still further object of the present invention is to provide a novel incinerator for aqueous waste material such as sewage sludge and similar material having the features and the characteristics set forth above which is of relatively inexpensive construction, is easy to maintain and clean and is suitable for long periods of sporadic or intermittent operation.

These and other objects of the present invention and the various features and details of the operation and construction thereof are hereinafter more fully set forth and described with reference to the accompanying drawings in which: The FIG. 1 is a longitudinal sectional view through an incinerator made in accordance with the present invention;

FIG. 2 is a transverse sectional view through the incinerator taken along line 2—2, FIG. 1;

FIG. 3 is an enlarged fragmentary longitudinal sectional view illustrating the means to supply the material to be incinerated to the incineration chamber and to atomize the material as it is injected into the incineration chamber;

FIG. 4 is a face view of the atomizing nozzle as viewed from the line 4—4, FIG. 3;

FIG. 5 is a transverse sectional view of the nozzle of FIG. 4 taken on line 5—5, FIG. 4 illustrating the arrangement of the nozzle openings for the atomizing air;

Figure 1:
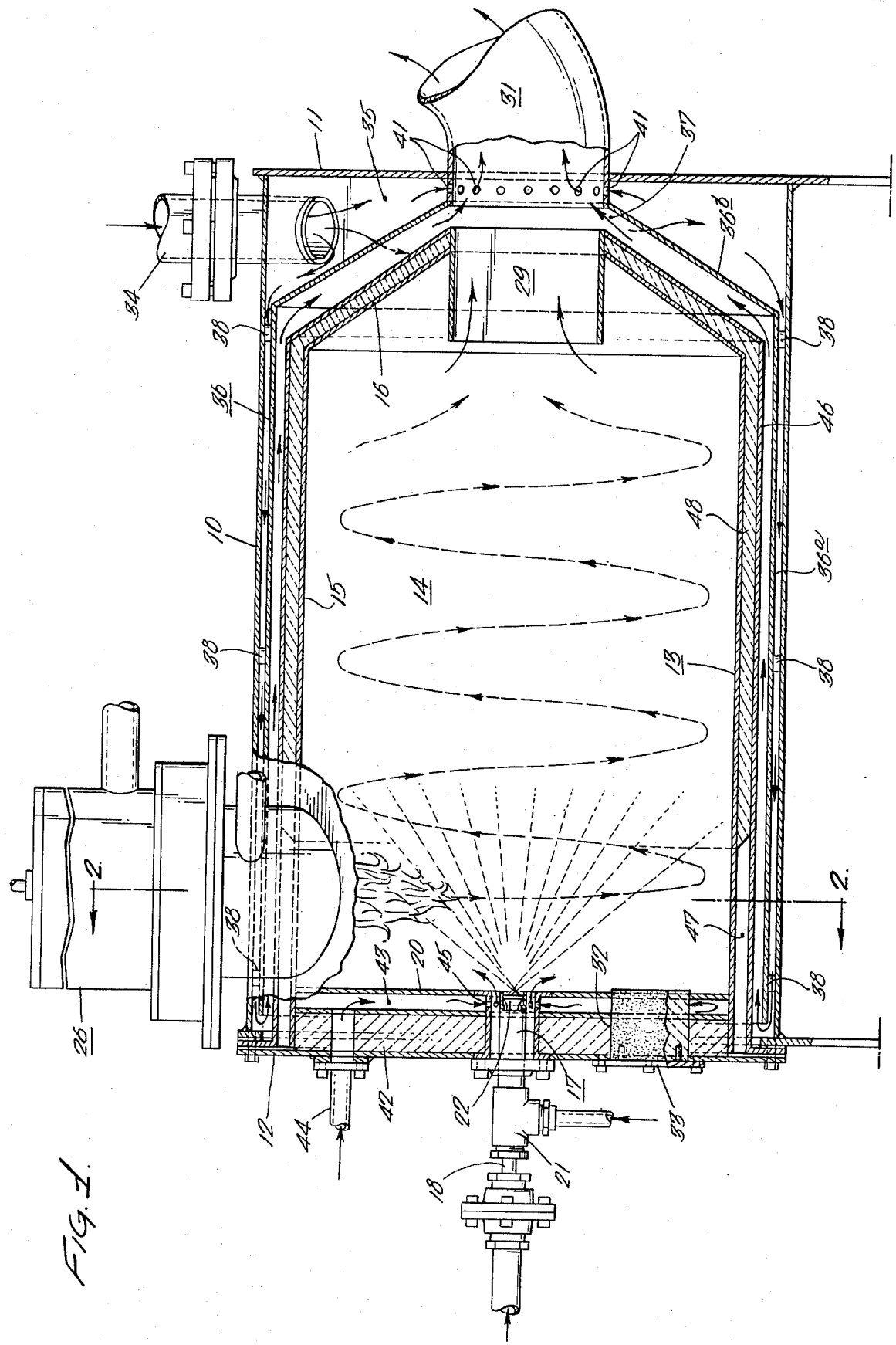

FIG. 6 is an enlarged fragmentary transverse sectional view as viewed at the circle designated FIG. 6 of FIG. 2 illustrating the means for securing the inner shell to the outer shell of the incinerator; and FIG. 7 is an enlarged fragmentary transverse sectional view as viewed at the circle designated FIG. 7 of FIG. 2 illustrating spacer means for maintaining an inner shell in position relative to the outer shell.

As set forth above, the incinerator of the present invention is primarily designed for the incineration of sewage sludge aboard ship, although this apparatus is suitable for the incineration of most any aqueous waste material. For this type of application, there will normally be an irregular intermittent operation of the incinerator with the incinerator operating only when there is a demand for the disposal of sewage sludge. The sewage sludge to be incinerated is collected as it is discharged from the lavatories and wash basins in a holding tank (not shown) where it is maintained in a stirred or agitated condition until the material in the tank reaches a predetermined level. At that time, operation of the incinerator is started and the material in the tank is pumped under pressure and injected into the incinerator. Incineration of the sewage sludge continues until the storage tank is substantially empty, at which time the pump is stopped and operation of the incinerator is halted.

Referring more specifically to the drawings, the incinerator of the present invention includes a generally cylindrical outer support shell or jacket 10 carried by forward and rearward support plates 11 and 12 respectively at the inlet and discharge ends of the incinerator. Positioned within and concentric with the outer shell is an inner shell or liner 13 which forms the incineration chamber 14. The inner shell has a generally cylindrical rearward portion 15 extending for the major length of the incineration chamber, terminating at the discharge end of the incineration chamber in a frusto-conical portion 16 converging inwardly to the exhaust outlet for the products of combustion.

The aqueous waste material to be incinerated is forced under pressure through an injection nozzle 17 constructed as illustrated in FIG. 3 of the drawings. This injection nozzle 17 includes a central unobstructed pipe or tube 18 having one end thereof connected to the source of the material to be incinerated and the other end terminating centrally of the rear wall 20 of the incineration chamber with the central pipe 18 preferably extending along the longitudinal axis of the incineration chamber. Surrounding and coaxial with the central pipe 18 is an air supply pipe 19 through which the atomizing air is forced under pressure. The rearward end of the air supply pipe 19 terminates in a fitting 21 to which the atomizing air under pressure is supplied from a source not shown while the forward end of the air supply pipe terminates at the rear wall 20 of the incineration chamber. Positioned within the forward terminal end of the air supply pipe 19 is an external atomizing tip 22 formed, for example, as illustrated in FIGS. 4 and 5 of the drawings.

The atomizing tip functions to atomize the central stream of aqueous waste material or sewage sludge, breaking up the liquid into fine droplets and breaking apart and dispersing the solid particles. This atomizing tip causes the liquid and solid particles to spray outwardly into the combustion chamber in the form of a conical pattern as shown in FIG. 1. Accordingly, the external atomizing tip 22 consists of a cylindrical main body portion 23 which is threaded over the terminal end of the central pipe 18 so that the material forced through the pipe 18 passes centrally through the atomizing tip 22. The body portion 23 terminates at its forward end in an outwardly flared portion 24 which engages against the inner surface of the air supply pipe 19. A series of small air directing openings 25 are provided in the outwardly flared portion of the atomizing tip to direct air at an angle inwardly toward the stream of aqueous waste material or sewage sludge and atomize the same.

In the form of the atomizing tip shown in the drawings, eight such openings 25 are provided with alternate openings, for example those on the horizontal and vertical diameters of FIG. 4 being directed inwardly toward the longitudinal axis of the injection nozzle, for example at an angle of 40°. The intermediate openings are inclined at a steeper angle, for example an angle of 50° and these intermediate openings are skewed in the same direction at a small angle, for example 15°, so that the air from the intermediate openings is not directed toward the longitudinal axis of the injection nozzle. This arrangement of openings serves to effectively break up the stream of aqueous waste material and create a finely atomized generally conical spray.

The atomized aqueous waste material injected into the incineration chamber is quickly brought up to incineration temperature by means of a high velocity jet of hot and substantially completely combusted gases directed tangentially into the incineration chamber adjacent the rear wall thereof by a burner 26. The burner 26 may be a conventional gas or oil fired burner having a refractory lined combustion chamber 27 into which the air and fuel are injected with the fuel being substantially completely burned within the combustion chamber 27 and the products of substantially complete combustion being ejected from a discharge opening 28 in the form of a high velocity gas stream formed of products of substantially complete combustion.

The off-center jet of hot gases directed into the incineration chamber follows a swirling path adjacent the periphery of the incineration chamber starting at the rear of the chamber and proceeding forwardly toward the frusto-conical end of the incineration chamber. Thus, the hot gases in effect wrap around the atomized spray of aqueous waste material so that the hot gases and not the liquid from the spray of waste material are in contact with the walls of the incineration chamber. At the same time, the solid particles to be incinerated are entrained in the rotating mass of hot gases and carried downstream toward the conical end of the incineration chamber. A discharge pipe 29 extending from the forward wall of the incineration chamber inwardly into the incineration chamber provides a central discharge opening for the products of combustion leading into an exhaust stack 31. This inwardly extending discharge pipe 29 also serves as a baffle and separator to retain the solid particles in the incineration chamber until they are completely combusted or oxidized and to prevent ash from being carried out of the incineration chamber with the gaseous products of combustion.

For aqueous waste containing sewage sludge, a minimum temperature of 1,250°F to 1,300°F, together with a retention time of approximately one-half second is necessary for complete incineration of the solid materials and elimination of all odors. The liquid portion of the sewage sludge is vaporized quickly because of its atomization while the solid particles are retained in the incineration chamber a sufficient time to be completely combusted or oxidized. Any ash which might remain after incineration of the solid particles can be removed from the combustion chamber when necessary through an access opening 32 in the rear wall of the combustion chamber, which access opening is normally closed by a removable insultated cover 33.

To minimize weight of the unit and provide a safe outer shell temperature for protection of personnel working near the unit, cooling air from a forced draft blower (not shown) is provided between the inner and outer shell. The cooling air is supplied to this space by means of a pipe 34 which connects the blower to a plenum chamber 35. The cooling air is caused to flow along the inner surface of the outer shell from the discharge end of the incinerator toward the rear wall and then make a 180° turn around the end of a baffle 36 and flow in the opposite direction to the discharge end of the incinerator. When the cooling air reaches the discharge end it passes into the stack through a gap 37 provided between the stack 31 and the end of the discharge pipe 29.

The baffle plate 36 is formed for example as illustrated in FIG. 1 of the drawings and includes a generally cylindrical portion 36a extending for the major length of the outer shell from a point short of the rearward end of the outer shell with the cylindrical portion terminating at its opposite end in a frusto-conical portion 36b which converges inwardly into engagement with the end of the stack 31. In order to position the baffle plate 36 relative to the outer shell, a series of rows of spacers in the form of small discs 38, for example as shown in FIG. 7, are secured to the inner wall of the outer shell and engage and support the baffle at spaced locations. Also, to secure the baffle in the proper position longitudinally relative to the outer shell, the last row of spacers adjacent the rear wall of the incineration chamber includes fastening means, as shown in FIGS. 2 and 6 in the form of pins 39 welded to the baffle 36 and the outer shell 10.

This air flow will maintain the temperature of the outer shell cool enough to protect personnel working in the area of the incinerator. In addition to maintaining the outer shell cool, it is also necessary to keep the stack relatively cool. This is accomplished by permitting some of the cooling air to enter the stack directly without passing back and forth along the incineration chamber. This stack cooling air enters the stack from the plenum chamber 35 through a series of openings 41. The size and number of openings 41 may be varied in accordance with design characteristics of the incinerator such as quantity of fuel supply and operating temperature so that an adequate amount of cooling air is supplied to properly temper the stack gases and maintain the stack at a desired low temperature.

Cooling air is also provided to the rear wall 20 of the incinerator for the purpose of maintaining the rear wall cool and in particular preventing the inner surface of the rear wall from becoming overheated. This rear wall has a rearward insulating section 42 and a forward air space 43 with cooling air being supplied to the forward air space from the blower through an air supply pipe 44. The cooling air passes along this air space 43 at the rear wall of the incinerator and is discharged from this air space through a series of small openings 45 surrounding the injection nozzle 17 so that the cooling air which is supplied to the rear wall also serves as additional combustion air for the waste material injected into the incineration chamber.

It is important to maintain a relatively uniform temperature along the length of the inner liner 15 surrounding the incineration chamber to minimize expansion problems and at the same time prevent overheating of the portion of the inner liner near the burner 26 to prevent corrosion of the inner liner. Accordingly, a jacket 46 is provided about the inner liner 13 with the jacket 46 being positioned coaxially of the inner liner and having a configuration similar to that of the inner liner so that a gap of relatively uniform thickness is provided between the jacket 46 and the inner liner 13. A free air space 47 is provided between the jacket 46 and the inner liner 13 at the rear end of the incineration chamber where the hot gases from the burner initially contact the surface of the inner liner. This free air space permits the transfer of heat from the inner liner to the cooling air supplied through the supply pipe 34. A fibre or batt type insulation 48 is wrapped about the inner liner in the space between the inner liner and the jacket 46 to slow down or deter transfer of heat from the inner liner at the relatively cooler down stream section of the inner liner. If desired, this insulation 48 may be made relatively thin adjacent the free air space 47 and gradually increase in thickness and insulation capability toward the down stream end of the inner liner to provide a closer control over the temperature of the inner liner.

From the foregoing it will be observed that the present invention provides a novel compact light-weight incinerator which will effectively and completely incinerate aqueous waste material containing organic solids, such as raw sewage sludge, will eliminate odors from the waste material and will not discharge any of the material through the stack to the atmosphere.

While a particular embodiment of the present invention has been illustrated and described herein it is not intended to limit the invention to such a disclosure and changes and modifications may be incorporated and embodied therein within the scope of the following claims.

I claim:

1. Apparatus for incinerating aqueous waste material comprising: a generally cylindrical incineration chamber having spaced end walls and an annular side wall, a discharge opening at one end of said end walls, said discharge opening leading to a stack for conveying away gaseous products of combustion from said incineration chamber, injection means centrally of the other of said end walls to inject a stream of said aqueous waste material into said incineration chamber in a direction toward said one end wall, said injection means including means to atomize said stream of aqueous waste material as it enters said incineration chamber and spray the same outwardly toward said annular wall, burner means having a combustion chamber therein and operable to burn a fuel and discharge at a high velocity a hot gaseous stream of products of substantially complete combustion, said burner means mounted adjacent said incineration chamber to discharge said high velocity hot gaseous stream of products of substantially complete combustion tangentially into said incineration chamber at a location adjacent said other end wall so that said gaseous stream encircles the atomized waste material and follows a swirling path about the atomized aqueous waste material along the annular wall of the incineration chamber toward said one end wall, an outer jacket about said annular wall, and means between said outer jacket and said annular wall to control the temperature of said annular wall and cool said outer jacket.

2. Apparatus in accordance with claim 1 wherein said outer jacket and said annular wall comprises concentric outer and inner metal shells, and means to cause cooling air to flow in a predetermined path between said outer jacket and said annular wall.

3. Apparatus in accordance with claim 2 wherein said annular wall has an insulated portion and a non-insulated portion, the non-insulated portion being in the form of an annular ring adjacent said other end wall.

4. Apparatus in accordance with claim 2 including baffle means interposed between said outer jacket and said annular wall, and the cooling air is first caused to flow between said baffle means and said outer jacket in a direction toward said other end wall and thereafter is caused to flow in a direction toward said one end wall between said baffle means and said annular wall.

5. Apparatus in accordance with claim 4 including a discharge tube having one end spaced from said stack at said discharge opening and the other end projecting inwardly into said incineration chamber, and said baffle means directs cooling air flowing between said baffle means and said annular wall to the space between said one end of said tube and said stack and into said stack.

6. Apparatus in accordance with claim 2 wherein said means to cause cooling air to flow between said outer jacket and said annular wall includes an annular plenum chamber adjacent said one end wall and said incineration chamber, an annular baffle extending from said plenum chamber toward said other end wall of said incineration chamber between said outer jacket and said annular wall so that cooling air flows first between said baffle and said outer jacket and thereafter between said baffle and said annular wall, and a plurality of openings leading from said plenum chamber directly to said stack to permit a predetermined portion of the cooling air from said plenum to flow directly into said stack.

7. Apparatus in accordance with claim 6 including insulation means interposed between said baffle and said annular wall and surrounding a portion of said annular wall remote from said other end of said incineration chamber.

8. Apparatus in accordance with claim 1 where said injection means includes an unobstructed tube extending in a direction axially of said incineration chamber and terminating at said other end wall to inject the stream of said aqueous waste material into said incineration chamber, and the means to atomize said stream of aqueous waste material includes an atomizing head surrounding the end of said tube at said other end wall of said incineration chamber, said atomizing head having a plurality of openings extending therethrough directed toward said stream of aqueous waste material, and means to force air at high velocity through said openings.

9. Apparatus in accordance with claim 8 wherein alternate openings of said plurality of openings are directed at an acute angle toward the axis of said stream of aqueous waste material, and intermediate openings between said alternate openings are directed at an acute angle toward points spaced from the axis of said stream of said aqueous waste material.

10. Apparatus in accordance with claim 8 wherein a chamber is provided adjacent said other end wall of said incineration chamber surrounding said injection nozzle, means providing a plurality of openings in said chamber about said injection nozzle, and means to force cooling air to flow into said chamber and out of said plurality of openings to cool said other end wall of said incineration chamber.

* * * * *

Disclaimer 3,861,330.—*Joseph J. Santoleri*, Berwyn, Pa. INCINERATOR FOR AQUEOUS WASTE MATERIAL. Patent dated Jan. 21, 1975. Disclaimer filed Oct. 2, 1981, by the assignee, *The Trane Co.*

Hereby enters this disclaimer to claims, 1, 2, 4, 5, 8 and 9 of said patent.

[*Official Gazette December 15, 1981.*]